(No Model.)

D. DRAWBAUGH.
TELEPHONE.

No. 293,154. Patented Feb. 5, 1884.

WITNESSES:
Gustave Dieterich
A. F. Stuart

INVENTOR
Daniel Drawbaugh
BY Park Benjamin & Bro.
His ATTORNEYS

UNITED STATES PATENT OFFICE.

DANIEL DRAWBAUGH, OF EBERLY'S MILL, PENNSYLVANIA.

TELEPHONE.

SPECIFICATION forming part of Letters Patent No. 293,154, dated February 5, 1884.

Application filed November 12, 1883. (No model.)

*To all whom it may concern:*

Be it known that I, DANIEL DRAWBAUGH, of Eberly's Mill, Cumberland county, Pennsylvania, have invented a new and useful Improvement in Telephones, of which the following is a specification.

This invention relates to a telephone-receiver in which both poles of the permanent magnet are presented to the diaphragm; and it consists more particularly in the novel disposition and arrangement of said poles, so that a greater magnetic influence may be exerted upon the diaphragm and the instrument rendered more sensitive.

Figure 1:
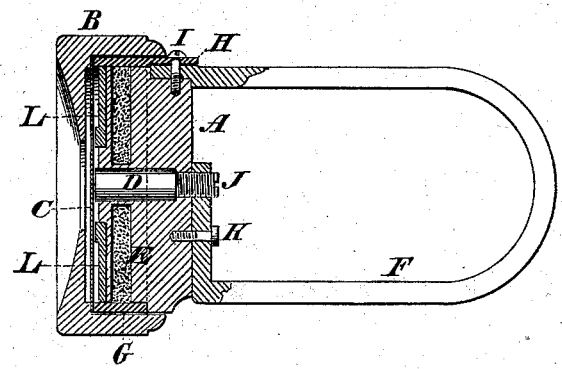
Figure 2:
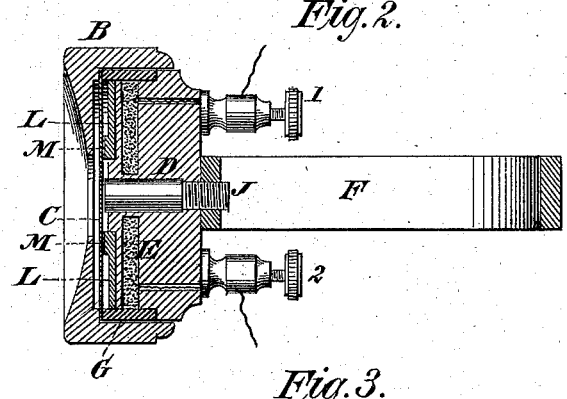
Figure 3:
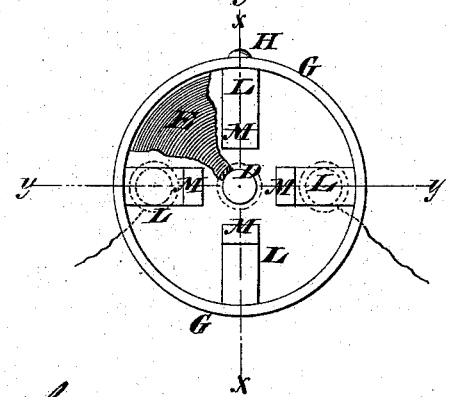

Referring to the drawings, Figure 1 is a sectional view of the instrument on the line $x\ x$ of Fig. 3. Fig. 2 is a sectional view on the line $y\ y$ of Fig. 3. Fig. 3 is a front view with the mouth-piece and diaphragm removed, a part of the casing of the instrument being broken away to show the coil.

Similar letters of reference indicate like parts.

A is the casing of the instrument.

B is the mouth-piece.

C is the diaphragm, of inductive material, preferably of soft iron.

D is the core.

E is the coil, the terminals of which pass through the case A and communicate with the line binding-posts 1 and 2.

F is the permanent magnet.

G is a ring of iron which encircles the coil. This ring has a projection or offset, H, which is connected by a screw, I, to one pole of the permanent magnet F. The same screw, I, serves to connect the ring and magnet to the case A. The other pole of the permanent magnet is connected by a screw, J, of inductive material, to the core D. The screw J is formed integrally with the core D, so that by turning said screw J the core D can be moved forward and back nearer to and farther from the diaphragm.

K is a screw serving to connect the permanent magnet F to the case A. On the front side of the casing A are formed radial recesses to receive a number of pole-pieces, L, of inductive material, said pole-pieces having their outer ends in contact with the ring G, and having small projections M on their inner ends. By reason of their contact with the ring G and of the ring G with the permanent magnet F the said pieces L become pole-pieces of the magnet F, all of the same name, but of opposite magnetization to that of the core D, which communicates with the other pole of the permanent magnet. I show four pole-pieces L here, but do not limit myself to any particular number.

It will be seen that I cause both poles of the magnet to act near to the center of the diaphragm, and thus at the point where they may exert the best effect in influencing vibrations of the same.

I claim as my invention—

The combination of the diaphragm C, ring G, and projection H, permanent magnet F, core D, and surrounding electro-magnet coil and pole-pieces L, substantially as described.

DANIEL DRAWBAUGH.

Witnesses:
FRED. M. OTT,
M. W. JACOBS.